US008565254B2

(12) United States Patent
Okubo et al.

(10) Patent No.: US 8,565,254 B2
(45) Date of Patent: Oct. 22, 2013

(54) RADIO BASE STATION

(75) Inventors: Naoto Okubo, Yokosuka (JP); Hiroyuki Ishii, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 210 days.

(21) Appl. No.: 13/128,071

(22) PCT Filed: Nov. 6, 2009

(86) PCT No.: PCT/JP2009/068957
§ 371 (c)(1),
(2), (4) Date: Jul. 12, 2011

(87) PCT Pub. No.: WO2010/053145
PCT Pub. Date: May 14, 2010

(65) Prior Publication Data
US 2011/0310817 A1 Dec. 22, 2011

(30) Foreign Application Priority Data
Nov. 7, 2008 (JP) ................................ P2008-287093

(51) Int. Cl.
*H04J 3/16* (2006.01)
(52) U.S. Cl.
USPC ........... 370/437; 370/442; 370/436; 370/431; 370/468
(58) Field of Classification Search
USPC ........................ 370/431, 442, 437, 436, 468
See application file for complete search history.

(56) References Cited

U.S. PATENT DOCUMENTS

| 2009/0209247 | A1* | 8/2009 | Lee et al. .................... 455/422.1 |
| 2010/0048219 | A1 | 2/2010 | Fukuoaka et al. |
| 2010/0118995 | A1 | 5/2010 | Fukui |
| 2010/0265862 | A1* | 10/2010 | Choi et al. .................... 370/311 |

FOREIGN PATENT DOCUMENTS

| WO | 2008/114541 A1 | 9/2008 |
| WO | 2008/129810 A1 | 10/2008 |

OTHER PUBLICATIONS

International Search Report w/translation from PCT/JP2009/068957 dated Jan. 26, 2010 (2 pages).
Written Opinion from PCT/JP2009/068957 dated Jan. 26, 2010 (3 pages).
3GPP TS 36.211 V10.1.0; "3rd Generation Partnership Project; Technical Specification Group Radio Access Network; Evolved Universal Terrestrial Radio Access (E-UTRA); Physical Channels and Modulation (Release 8)"; Mar. 2011 (103 pages).
European Search Report issued in European Application No. 09824844.6 dated Apr. 25, 2013 (6 pages).

(Continued)

*Primary Examiner* — Omer Mian
(74) *Attorney, Agent, or Firm* — Osha Liang LLP

(57) ABSTRACT

A radio base station (eNB) according to the present invention includes an aggregation level determination unit configured to determine an aggregation level based on CQI notified from a mobile station (UE), a control channel element assignment unit configured to assign a plurality of continuous CCE to a PDCCH addressed to the mobile station (UE), based on the determined aggregation level, and a resource assignment unit configured to assign resource element groups constituting the assigned CCE as a resource for the PDCCH addressed to the mobile station (UE). The control channel element assignment unit is configured to assign a plurality of continuous CCE to the PDCCH addressed to the mobile station (UE) based on an aggregation level changed by the aggregation level determination unit, when failing to assign CCE to the PDCCH addressed to the mobile station (UE).

4 Claims, 12 Drawing Sheets

(56) References Cited

OTHER PUBLICATIONS

NTT DoCoMo; "PDCCH Allocation Based on Hashing Function Generation Method for PDCCH Blind Decoding"; 3GPP TSG RAN WG1 Meeting #52bis, 081406; Shenzhen, China; Mar. 31-Apr. 4, 2008 (4 pages).

3GPP TS 36.211 v8.4.0; "3rd Generation Partnership Project; Technical Specification Group Radio Access Network; Evolved Universal Terrestrial Radio Access (E-UTRA); Physical Channels and Modulation (Release 8)"; Sep. 2008 (78 pages).

* cited by examiner

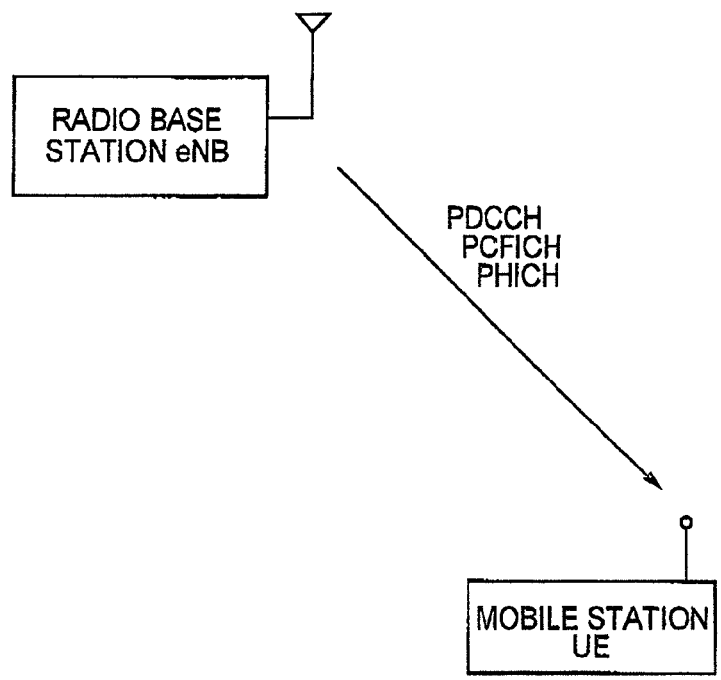
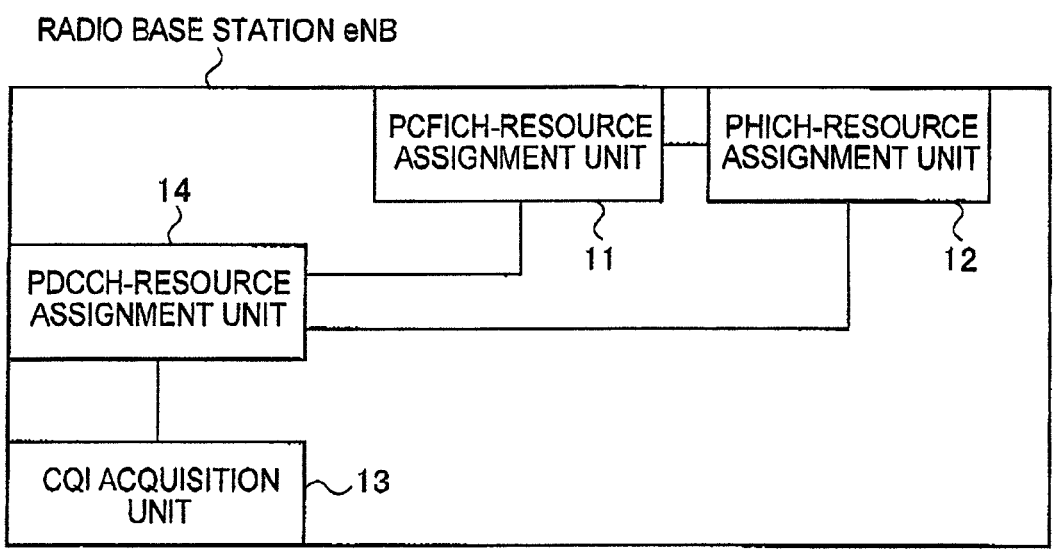

FIG. 7

| TYPE | Aggregation level(L) | SIZE (CCE UNIT) | PDCCH CANDIDATE NUMBER |
|---|---|---|---|
| UE-SPECIFIC SEARCH SPACE | 1 | 6 | 6 |
| | 2 | 12 | 6 |
| | 4 | 8 | 2 |
| | 8 | 16 | 2 |
| COMMON SEARCH SPACE | 8 | 16 | 2 |
| | 4 | 16 | 4 |

RADIO BASE STATION

TECHNICAL FIELD

The present invention relates to a radio base station configured to assign a control channel element including a plurality of continuous resource element groups in an available radio resource to a physical downlink control channel.

BACKGROUND ART

In mobile communication systems of the LTE (Long Term Evolution) scheme being developed for standardization in the 3GPP, "CFI (Control Format Indicator)", "DCI (Downlink Control Information)", and "HI (HARQ Indicator)" are configured to be transmitted as control information in a downlink.

In this case, the CFI is information indicating an OFDM symbol number, of 14 OFDM symbols within one subframe, which is used in a control channel in a downlink.

Moreover, the DCI is control information (resource assignment information, a modulation method, etc.) necessary to transmit uplink data and downlink data. It is noted that there are two types of DCI, i.e., common DCI covering all mobile stations UE and specific DCI covering a specific mobile station UE (a specific mobile station UE or a mobile station UE in a specific group).

Moreover, the HI is transmission confirmation information (ACK/NACK) for the uplink data.

Further, in the mobile communication system of the LTE scheme, the CFI is configured to be transmitted via PCFICH (Physical Control Format Indicator Channel), the DCI is configured to be transmitted via PDCCH (Physical Downlink Control Channel), and the HI is configured to be transmitted via Physical hybrid-ARQ Indicator Channel.

SUMMARY OF THE INVENTION

Problems to be Solved by the Invention

The mobile communication system of the LTE scheme, however, has a problem that how a radio resource is assigned to the control channels (PCFICH, PDCCH, PHICH, etc.) in the above-mentioned downlink is not defined.

Therefore, the present invention is intended to overcome the above-described problem. An object of the present invention is to provide a radio base station capable of assigning an appropriate radio resource to a physical downlink control channel, in a high-speed mobile communication system like a mobile communication system of the LTE scheme.

Means for Solving the Problem

A first aspect of the present invention is summarized as a radio base station configured to assign a control channel element including a plurality of continuous resource element groups in an available radio resource to a physical downlink control channel, the radio base station including: an aggregation level determination unit configured to determine an aggregation level indicating the number of continuous control channel elements to be assigned to the physical downlink control channel, based on reception quality notified from a mobile station; a control channel element assignment unit configured to assign a plurality of continuous control channel elements to a physical downlink control channel addressed to the mobile station, based on the determined aggregation level; and a resource assignment unit configured to assign resource element groups constituting the assigned control channel elements as a resource for the physical downlink control channel addressed to the mobile station, wherein the control channel element assignment unit is configured to assign a plurality of continuous control channel elements to the physical downlink control channel addressed to the mobile station based on an aggregation level changed by the aggregation level determination unit, when failing to assign control channel elements to the physical downlink control channel addressed to the mobile station.

Effect of the Invention

As explained above, according to the present invention, it is possible to provide a radio base station capable of assigning an appropriate radio resource to a physical downlink control channel.

BRIEF DESCRIPTION OF THE DRAWINGS

FIG. 1 is a diagram showing the entire configuration of a mobile communication system according to a first embodiment of the present invention.

FIG. 2 is a functional block diagram of a radio base station according to the first embodiment of the present invention.

FIG. 7 is a diagram explaining a search space in which decoding of PDCCH is attempted by the mobile station, in the mobile communication system according to the first embodiment of the present invention.

BEST MODES FOR CARRYING OUT THE INVENTION (Configuration of Mobile Communication System According to First Embodiment of the Present Invention)

With reference to FIG. 1 to FIG. 11, the configuration of the mobile communication system according to the first embodiment of the present invention will be explained.

The mobile communication system according to the embodiment is a mobile communication system of the LTE scheme, and includes: a radio base station eNB; and a mobile station UE. As illustrated in FIG. 1, in the mobile communication system according to the embodiment, DCI, CFI, and HI as control information in a downlink is configured to be transmitted via PDCCH, PCFICH, or PHICH as a control channel in the downlink.

As illustrated in FIG. 2, the radio base station eNB according to the present embodiment includes a PCFICH-resource assignment unit 11, a PHICH-resource assignment unit 12, a CQI acquisition unit 13, and a PDCCH-resource assignment unit 14.

The PCFICH-resource assignment unit 11 is configured to assign a resource for the PCFICH in each cell.

Here, since the mobile station UE does not recognize the number of OFDM symbols used for the control channel in the downlink unless it acquires the CFI by demodulating the PCFICH, the PCFICH-resource assignment unit 11 is configured to assign an OFDM symbol positioned at the head of each subframe as the resource for the PCFICH.

Figure 3A:
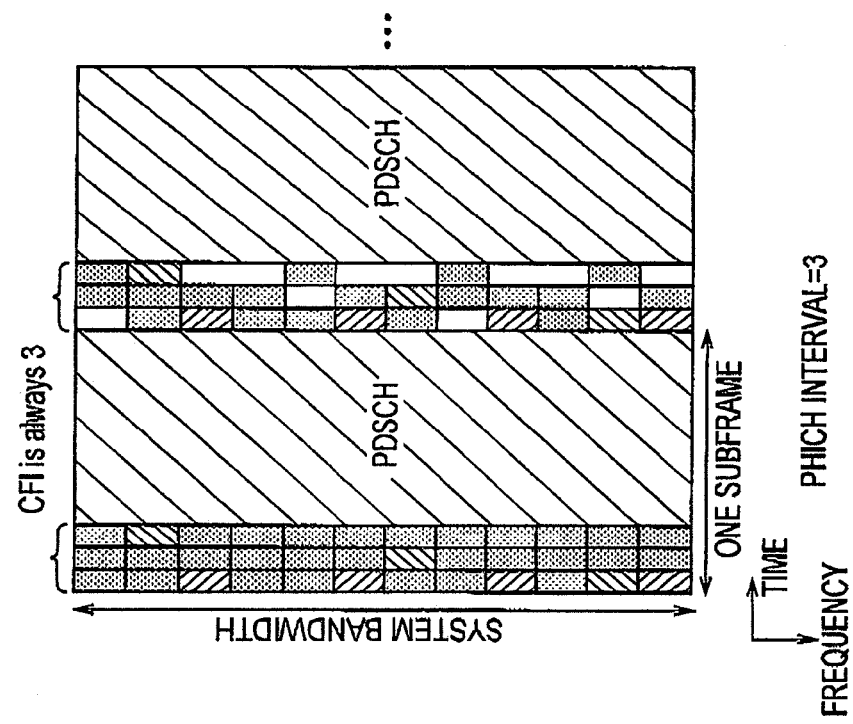
FIG. 3 is a diagram explaining a frame structure for a downlink, used in the mobile communication system according to the first embodiment of the present invention.
Figure 3B:
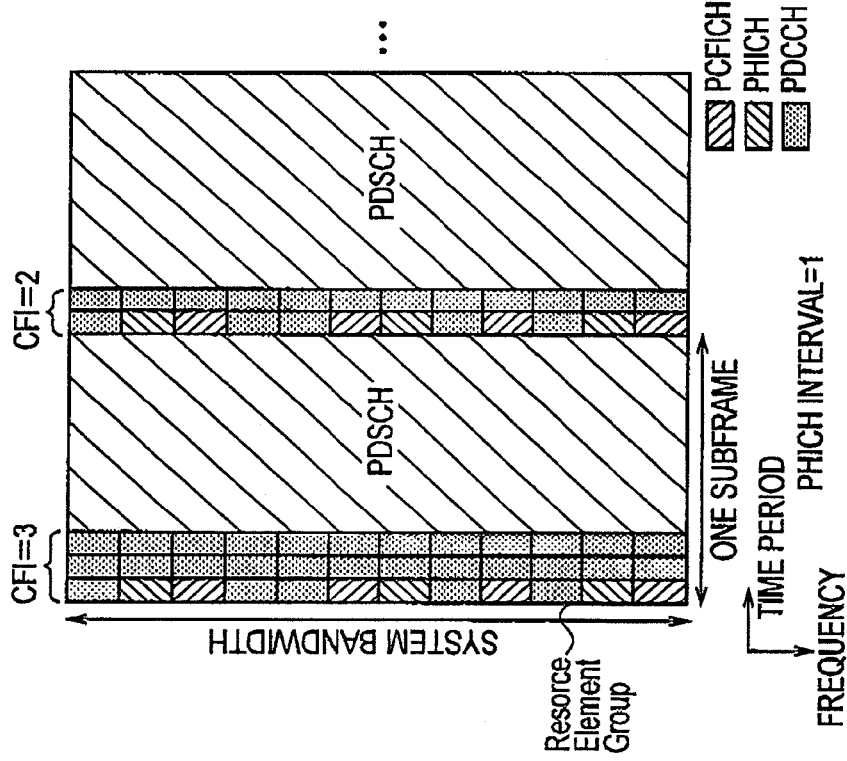

Specifically, as illustrated in FIG. 3A and FIG. 3B, the PCFICH-resource assignment unit 11 is configured to assign four "Resource Element Groups" as the resource for the PCFICH in each subframe.

Here, the "Resource Element Group" is a minimum unit for assigning a radio resource to the control channel in the downlink. Specifically, the "Resource Element Group" includes four "Resource Elements".

In addition, the PCFICH-resource assignment unit 11 is configured to select four "Resource Element Groups" to be assigned as the resource for the PCFICH by performing a calculation using cell identification information (cell IDs) and a system bandwidth such that the selected four "Resource Element Groups" are approximately equally arranged in the whole of the system bandwidth.

The PHICH-resource assignment unit 12 is configured to assign a resource for the PHICH which is addressed to the mobile station UE belonging to each PHICH group.

When a "Normal Duration" is applied, the PHICH-resource assignment unit 12 is configured to assign an OFDM symbol positioned at the head of each subframe as the resource for the PHICH, as illustrated in FIG. 3A.

Meanwhile, when an "Extended Duration" is applied, the PHICH-resource assignment unit 12 is configured to assign three OFDM symbols positioned at the head of each subframe as the resource for the PHICH, as illustrated in FIG. 3B.

Specifically, as illustrated in FIG. 3A and FIG. 3B, the PHICH-resource assignment unit 12 is configured to assign three "Resource Element Groups" as the resource for the PHICH in each subframe.

In addition, the PHICH-resource assignment unit 12 is configured to select three "Resource Element Groups" to be assigned as the resource for the PHICH by performing a calculation using the number of "Resource Element Groups", except for the cell identification information (cell IDs) and the "Resource Element Groups" assigned to the PCFICH, such that the selected three "Resource Element Groups" are approximately equally arranged in the whole of the system bandwidth.

The CQI acquisition unit 13 is configured to acquire reception quality of a pilot signal in the downlink, which is notified from the mobile station UE, specifically, a CQI (Channel Quality Indicator).

The PDCCH-resource assignment unit 14 is configured to assign a resource for the PDCCH which is addressed to each mobile station.

As illustrated in FIG. 3A and FIG. 3B, the PDCCH-resource assignment unit 14 is configured to assign maximum three or four OFDM symbols positioned at the head of each subframe as the resource for the PDCCH, and the OFDM symbol number is controlled by the CFI.

Specifically, the PDCCH-resource assignment unit 14 is configured to assign resource element groups, which have not been assigned as the resources for the PCFICH and the PHICH among the OFDM symbols assigned to the downlink control channel by the CFI, as the resource for the PDCCH.

The PDCCH-resource assignment unit 14 is configured to assign a radio resource to each PDCCH in units of a "CCE (Control Channel Element)".

Here, the CCE is a minimum unit for assigning a radio resource to the PDCCH, and includes a plurality of continuous "Resource Element Groups" among the "Resource Element Groups" having not been assigned as the resources for the PCFICH and the PHICH, for example, nine continuous "Resource Element Groups".

"Resource Element Groups" constituting the CCE are sequenced as described below and nine continuous "Resource Element Groups" will be referred to as the "CCE".

Figure 4:
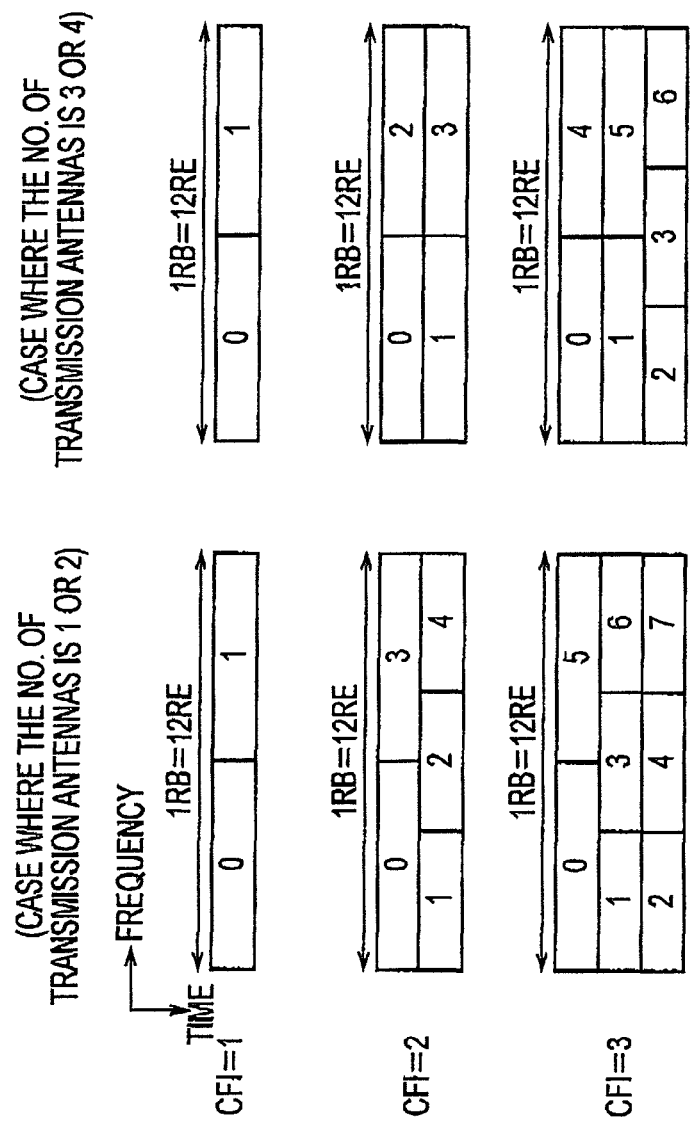
FIG. 4 is a diagram explaining CCE which is a minimum resource unit assignable to PDCCH, and indexing of "Resource Element Group", in the mobile communication system according to the first embodiment of the present invention.

For example, when the number of transmission antennas in the radio base station eNB is one or two and "CFI=1", "Resource Element Group" #0 and "Resource Element Group" #1 are arranged in one RB (Resource Block) as illustrated in FIG. 4.

Here, the RB includes seven OFDM symbols in the time direction and 12 subcarriers in the frequency direction and is a minimum unit for assigning a radio resource to a data channel. Specifically, the RB includes 84 (=12×7) "Resource Elements".

Furthermore, when the number of transmission antennas in the radio base station eNB is one or two and "CFI=2", "Resource Element Groups" #0 to #4 are arranged in one RB as illustrated in FIG. 4. When the number of transmission antennas in the radio base station eNB is one or two and "CFI=3", "Resource Element Groups" #0 to #7 are arranged in one RB as illustrated in FIG. 4.

Meanwhile, when the number of transmission antennas in the radio base station eNB is three or four and "CFI=1", "Resource Element Groups" #0 and #1 are arranged in one RB as illustrated in FIG. 4.

Furthermore, when the number of transmission antennas in the radio base station eNB is three or four and "CFI=2", "Resource Element Groups" #0 to #3 are arranged in one RB as illustrated in FIG. 4. When the number of transmission antennas in the radio base station eNB is three or four and "CFI=3", "Resource Element Groups" #0 to #6 are arranged in one RB as illustrated in FIG. 4.

Each "Resource Element Group" is configured to be specified by "Resource Element Group" indexes (e.g., "Resource Element Groups" #0 to #7). The "Resource Element Group" indexes are assigned according to the following standard.

(1) When a minimum frequency of a subcarrier corresponding to a "Resource Element" included in a first "Resource Element Group" is smaller than a minimum frequency of a subcarrier corresponding to a "Resource Element" included in a second "Resource Element Group", a "Resource Element Group" index for specifying the first "Resource Element Group" is smaller than a "Resource Element Group" index for specifying the second "Resource Element Group".

(2) When the minimum frequency of the subcarrier corresponding to the "Resource Element" included in the first "Resource Element Group" is equal to the minimum frequency of the subcarrier corresponding to the "Resource Element" included in the second "Resource Element Group", and when an OFDM symbol number corresponding to the "Resource Element" included in the first "Resource Element Group" is smaller than an OFDM symbol number corresponding to the "Resource Element" included in the second "Resource Element Group", the "Resource Element Group" index for specifying the first "Resource Element Group" is smaller than the "Resource Element Group" index for specifying the second "Resource Element Group".

In addition, when the "Resource Element Group" indexes are assigned over a plurality of RBs, the "Resource Element Group" indexes are assigned by a serial number from an RB including a "Resource Element" corresponding to a subcarrier with the smallest frequency in the system band.

In addition, the "Resource Element Groups" assigned to the PCFICH and the PHICH are not considered, when indexes are added to "Resource Element Groups".

The "Resource Element Groups", to which the indexes have been added as described above, are defined as one CCE in units of nine from the head of the "Resource Element Groups", and CCE indexes are sequentially assigned.

For example, CCE#0 corresponds to "Resource Element Groups" #0 to #8, and CCE#1 corresponds to "Resource Element Groups" #9 to #17.

The PDCCH-resource assignment unit 14 is configured to determine an "Aggregation Level" indicating the number of CCEs to be continuously assigned to the PDCCH, based on the CQI (reception quality) notified from the mobile station UE.

The PDCCH-resource assignment unit 14 is configured to assign a plurality of continuous CCEs to a PDCCH addressed to the mobile station UE, based on the determined "Aggregation Level".

Here, an assignable CCE is determined for each "Aggregation Level".

For example, when the "Aggregation Level" is "n", the PDCCH-resource assignment unit 14 can assign only n continuous CCEs, which employ CCEs of CCE indexes corresponding to the multiple of n as a head, to the PDCCH addressed to the mobile station UE.

Figure 5:
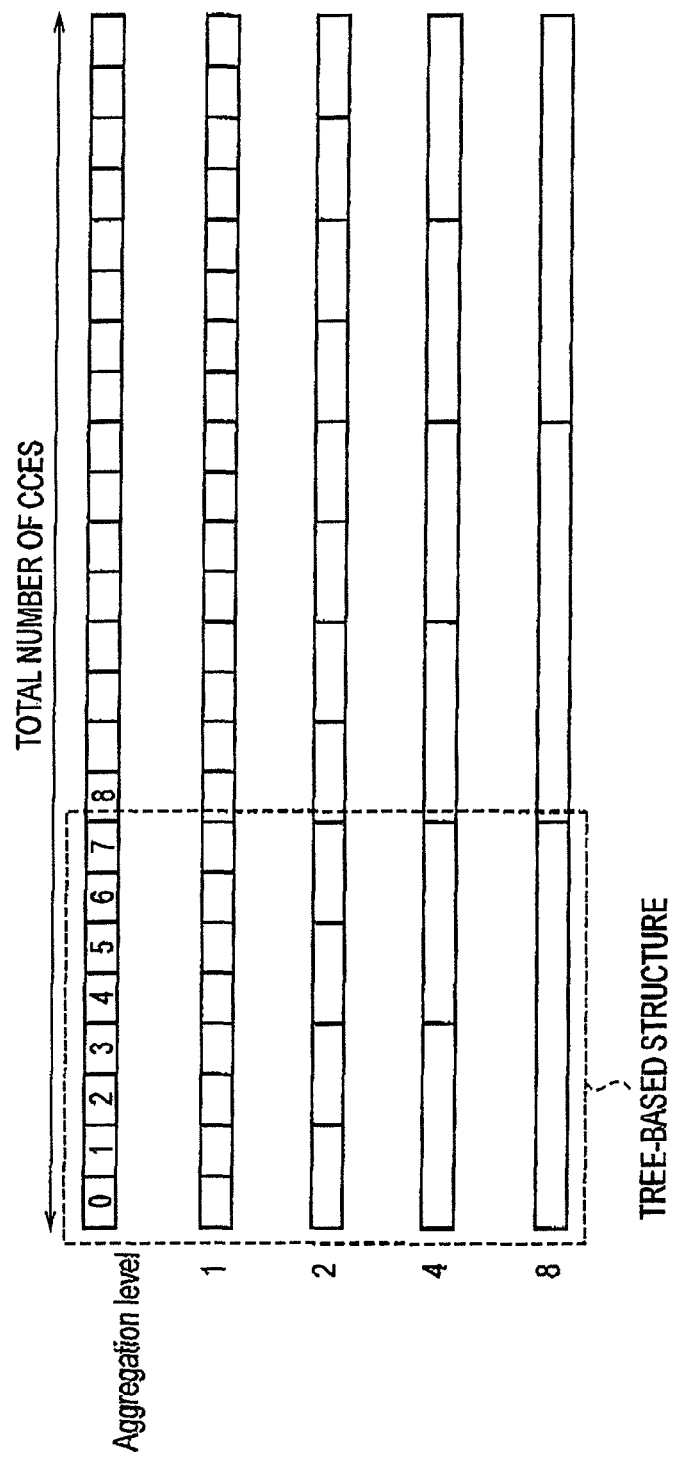
FIG. 5 is a diagram explaining restriction upon assigning a resource to PDCCH, in the mobile communication system according to the first embodiment of the present invention.

In the example of FIG. 5, when the "Aggregation Level" is "1", the PDCCH-resource assignment unit 14 can assign one continuous CCE (e.g., CCE#0), which employs CCE#0, #1 . . . corresponding to the multiple of 1 as a head, to the PDCCH addressed to the mobile station UE.

Furthermore, in the example of FIG. 5, when the "Aggregation Level" is "2", the PDCCH-resource assignment unit 14 can assign two continuous CCEs (e.g., CCE#0 and CCE#1), which employ CCE#0, #2 . . . corresponding to the multiple of 2 as a head, to the PDCCH addressed to the mobile station UE.

Furthermore, in the example of FIG. 5, when the "Aggregation Level" is "4", the PDCCH-resource assignment unit 14 can assign four continuous CCEs (e.g. , CCE#0 to CCE#3) , which employ CCE#0, #4 . . . corresponding to the multiple of 4 as a head, to the PDCCH addressed to the mobile station UE.

In addition, in the example of FIG. 5, when the "Aggregation Level" is "8", the PDCCH-resource assignment unit 14 can assign eight continuous CCEs (e.g., CCE#0 to CCE#7), which employ CCE#0, #8 . . . corresponding to the multiple of 8 as a head, to the PDCCH addressed to the mobile station UE.

Here, since the mobile station UE does not recognize a CCE to be assigned to a PDCCH addressed to the mobile station UE and an "Aggregation Level" to be selected, it is necessary to attempt to decode the PDCCH with respect to all CCEs, which may be assigned to the PDCCH addressed to the mobile station UE, in a round-robin fashion. In this regard, the assignable CCEs are limited (a Tree-based structure is arranged), so that it is possible to reduce the number of times by which the PDCCH is attempted to be decoded in the mobile station UE.

In addition, in order to reduce the number of times by which the PDCCH is attempted to be decoded in the mobile station UE, the PDCCH-resource assignment unit 14 may be configured to determine a "UE-specific search space (mobile station UE-dedicated search space)" for each mobile station UE, and to assign the CCE to the PDCCH addressed to the mobile station UE in the UE-specific search spaces of each mobile station UE.

Figure 6:
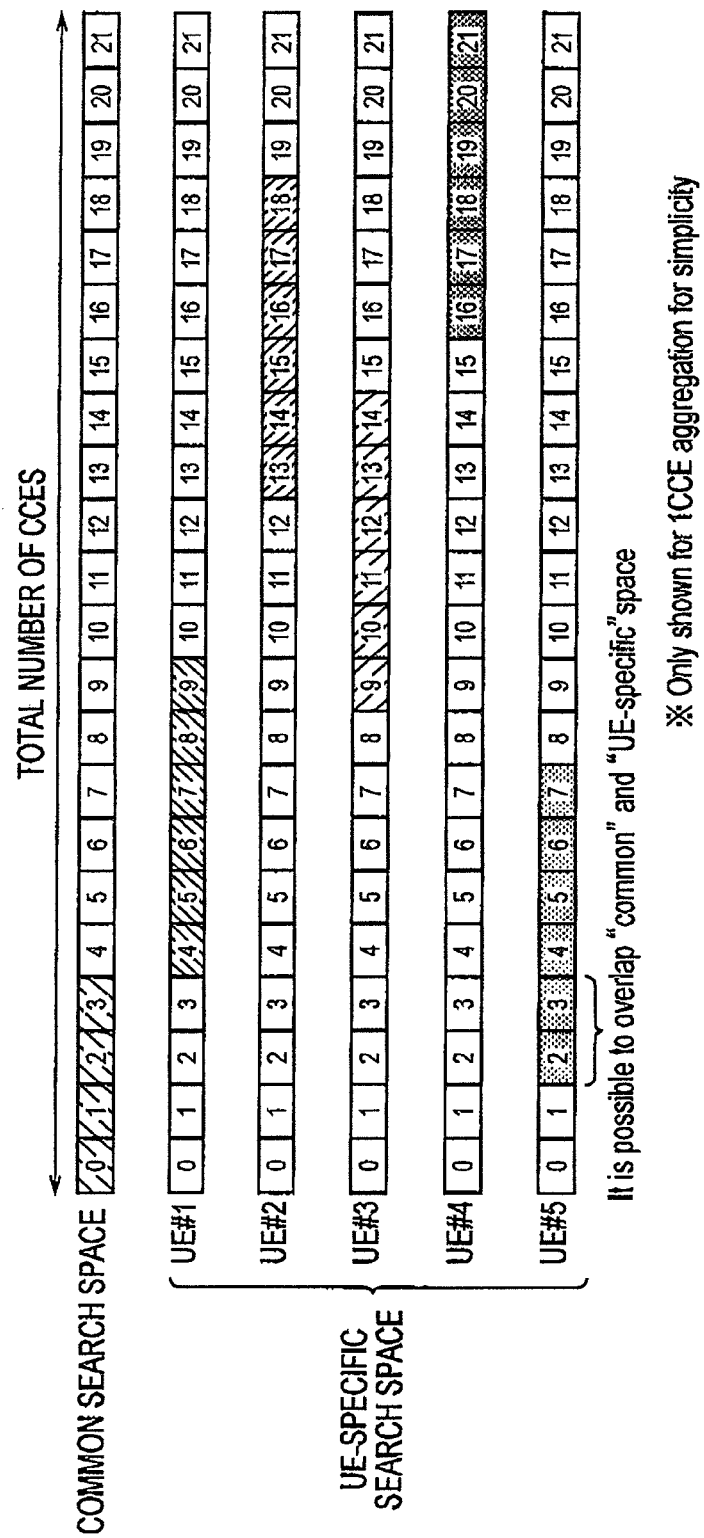
FIG. 6 is a diagram explaining the size of a search space in which decoding of PDCCH is attempted by the mobile station, in the mobile communication system according to the first embodiment of the present invention.

As illustrated in FIG. 6, the mobile station UE is configured to attempt to decode the PDCCH in a search space, specifically, a "Common search space" and a UE-specific search space determined as the mobile station UE-dedicated search space.

Here, the common search space indicates the range of a CCE in which all mobile stations UE search for PDCCHs (decoding of PDCCHs is attempted) in an available radio resource, and the UE-specific search space indicates the range of a CCE in which each mobile station UE searches for PDCCHs (decoding of PDCCHs is attempted) addressed to each mobile station UE in the available radio resource.

In addition, a PDCCH for a data channel used for common control, such as a dynamic broadcast channel D-BCH, a paging channel PCH or an "RACH Response", is assigned to the common search space. The common search space includes CCE#0 to CCE#15 and the "Aggregation Level" of the common search space is "4" or "8".

Furthermore, uplink scheduling information and downlink scheduling information addressed to a target mobile station UE are assigned to the UE-specific search space.

As illustrated in FIG. 6, a common search space may overlap a UE-specific search space for a specific mobile station UE (e.g., a UE-specific search space for a mobile station UE#5).

Furthermore, UE-specific search spaces for specific mobile stations UE (e.g. , a UE-specific search space for a mobile station UE#1 and a UE-specific search space for a mobile station UE#5) may overlap each other.

Furthermore, such search spaces are different from each other in terms of a type (a common search space or a UE-specific search space) and an "Aggregation Level".

In the example of FIG. 7, when the search space is the "UE-specific search space" and the "Aggregation Level" is "1" the size of the search space corresponds to six CCEs, and the number of CCE (one CCE) candidates assignable to the PDCCH in the search space is "6".

Furthermore, when the search space is the "UE-specific search space" and the "Aggregation Level" is "2", the size of the search space corresponds to 12 CCEs, and the number of CCE (two continuous CCEs) candidates assignable to the PDCCH in the search space is "6".

Furthermore, when the search space is the "UE-specific search space" and the "Aggregation Level" is "4", the size of the search space corresponds to eight CCEs, and the number of CCE (four continuous CCEs) candidates assignable to the PDCCH in the search space is "2".

Furthermore, when the search space is the "UE-specific search space" and the "Aggregation Level" is "8", the size of the search space corresponds to 16 CCEs, and the number of CCE (eight continuous CCEs) candidates assignable to the PDCCH in the search space is "2".

Furthermore, when the search space is the "common search space" and the "Aggregation Level" is "8", the size of the search space corresponds to 16 CCEs, and the number of CCE (eight continuous CCEs) candidates assignable to the PDCCH in the search space is "2".

In addition, when the search space is the "common search space" and the "Aggregation Level" is "4", the size of the search space corresponds to 16 CCEs, and the number of CCE (four continuous CCEs) candidates assignable to the PDCCH in the search space is "4".

Moreover, the PDCCH-resource assignment unit 14 may be configured to uniquely determine a mobile station UE-dedicated search space, based on identification information (UE-ID) of the mobile station UE, an "Aggregation Level" determined for the mobile station UE, and a subframe number in the available radio resource.

Figure 8:
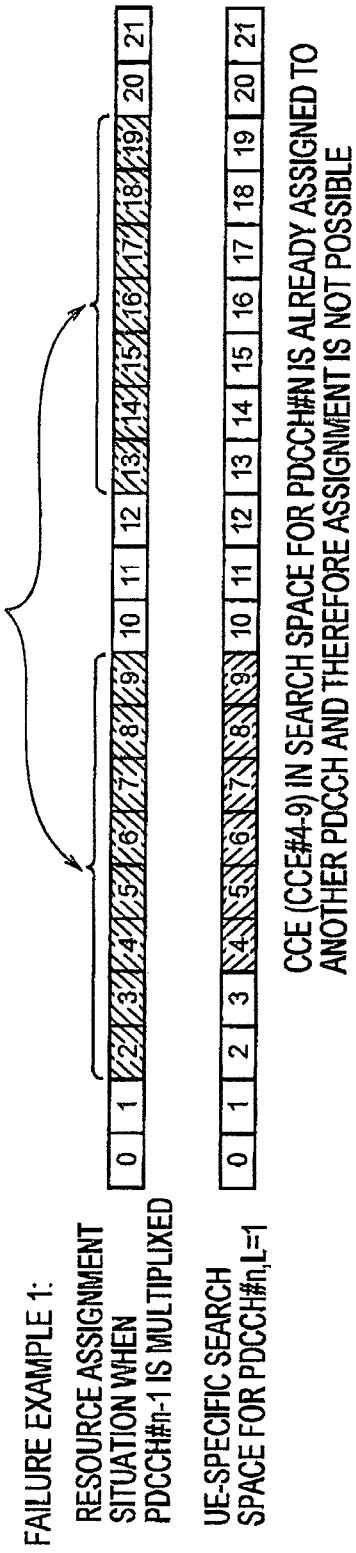
FIG. 8 is a diagram explaining an example where assignment of PDCCH resource is failed, in the mobile communication system according to the first embodiment of the present invention.
Figure 9:
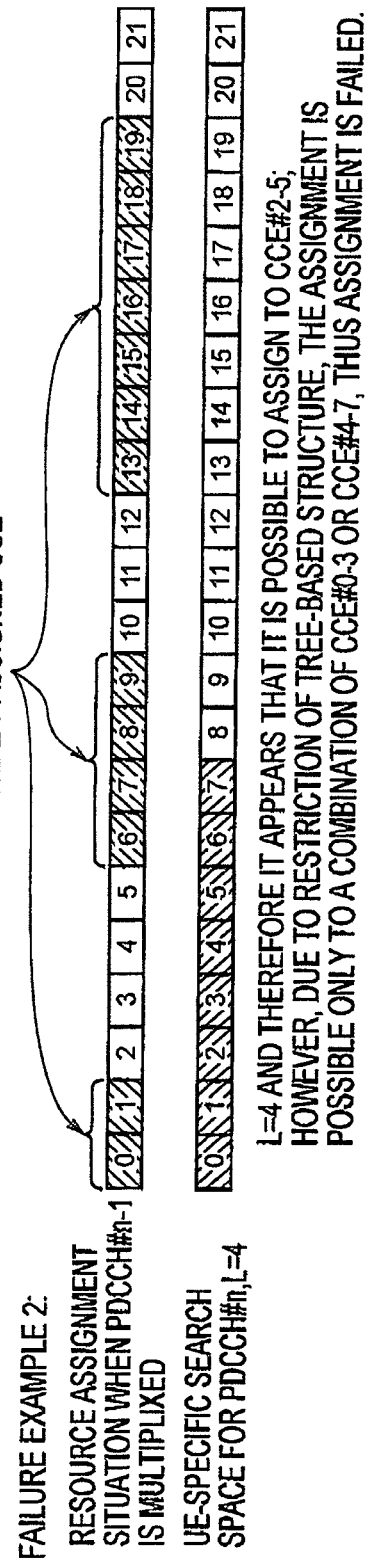
FIG. 9 is a diagram explaining an example where assignment of PDCCH resource is failed, in the mobile communication system according to the first embodiment of the present invention.

However, when UE-specific search spaces overlap each other among a plurality of mobile stations UE as illustrated in FIG. 8 and FIG. 9, a case may occur in which the PDCCH-resource assignment unit 14 may not assign a CCE (a radio resource) to a PDCCH addressed to a specific mobile stations UE.

CCEs are sequentially assigned to each PDCCH, and a PDCCH, to which the CCE is assigned in an n-th order, will be referred to as a PDCCH#n.

For example, in the case of FIG. 8, in the state where a CCE has been assigned to a PDCCH#n−1, when CCE#2 to CCE9 and CCE#13 to CCE#19 have been already assigned, and when a UE-specific search space for the PDCCH#n ("Aggregation Level"=1) is CCE#4 to CCE#9, the PDCCH-resource assignment unit 14 may not assign the CCE to the PDCCH#n.

Furthermore, in the case of FIG. 9, in the state where a CCE has been assigned to the PDCCH#n−1, when CCE#0, CCE#1, CCE#6 to CCE#9 and CCE#13 to CCE#19 have been already assigned, and when the UE-specific search space for the PDCCH#n (the "Aggregation Level" is 4) is CCE#0 to CCE#7, the PDCCH-resource assignment unit 14 may not assign the CCE to the PDCCH#n.

The reason for this is because the PDCCH-resource assignment unit 14 can assign only CCE#0 to CCE#3 or CCE#4 to CCE#7 to the PDCCH#n ("Aggregation Level"=4) due to the tree-based structure.

Consequently, when failing to assign the CCE to the PDCCH addressed to the mobile station UE, the PDCCH-resource assignment unit 14 changes the "Aggregation Level", and to assign a plurality of continuous CCEs to the PDCCH addressed to the mobile station UE based on the changed "Aggregation Level".

Figure 10:
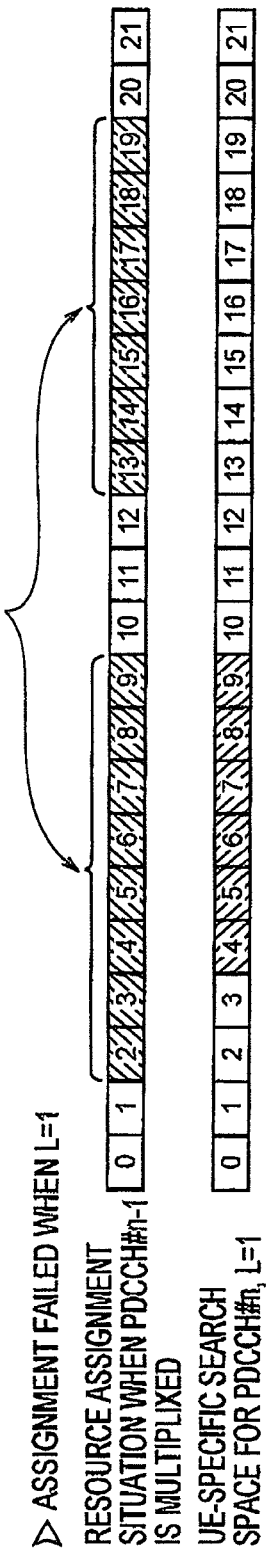
FIG. 10 is a diagram explaining a method of avoiding the failure of PDCCH-resource assignment, in the mobile communication system according to the first embodiment of the present invention.

For example, as illustrated in FIG. 10, in the state where the CCE has been assigned to the PDCCH#n−1, when CCE#2 to CCE9 and CCE#13 to CCE#19 have been already assigned, and when the UE-specific search space for the PDCCH#n ("Aggregation Level"=1) is CCE#4 to CCE#9, the PDCCH-resource assignment unit 14 may not assign the CCE to the PDCCH#n.

Figure 11:
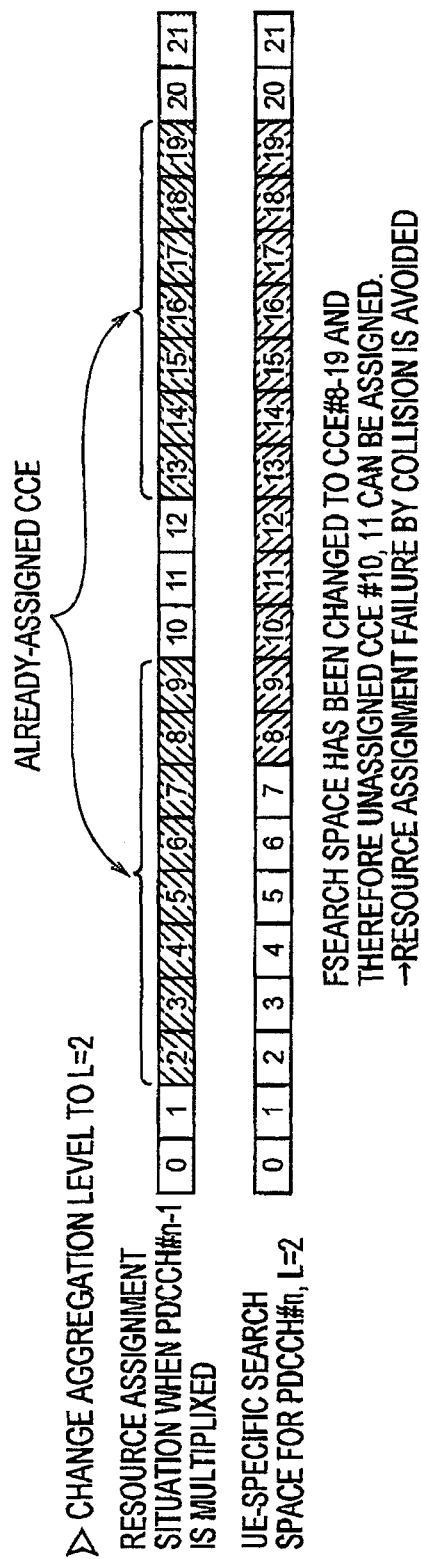
FIG. 11 is a diagram explaining a method of avoiding the failure of PDCCH-resource assignment, in the mobile communication system according to the first embodiment of the present invention.

In such a case, as illustrated in FIG. 11, the PDCCH-resource assignment unit 14 changes the "Aggregation Level" from "1" to "2", the UE-specific search space for the PDCCH#n ("Aggregation Level"=2) is changed to CCE#8 to CCE#19.

As a consequence, the PDCCH-resource assignment unit 14 can assign CCE#10 and CCE#11 to the PDCCH#n.

In such a case, since reception quality in the mobile station UE is also changed when the "Aggregation Level" is changed, the radio base station eNB may be configured to use transmission power control in a downlink based on the CQI notified from the mobile station UE such that desired quality can be satisfied.

Furthermore, the PDCCH-resource assignment unit 14 is configured to assign CCEs in the common search space as a resource for a PDCCH for transmitting a common DCI in the first place, to assign CCEs in the UE-specific search space to a PDCCH addressed to a mobile station UE with the highest priority in the second place, and to assign CCEs in the UE-specific search space to a PDCCH addressed to another mobile station UE in the third place sequentially.

Here, as will be described later, the PDCCH-resource assignment unit 14 maybe configured to employ patterns with the smallest number, by which the assignment of CCEs to the PDCCH addressed to another mobile station UE is failed, from among a plurality of assignment patterns with respect to the CCEs for the PDCCH addressed to the mobile station UE with the highest priority, and to assign CCEs to PDCCHs addressed to all mobile stations UE based on the employed patterns.

The PDCCH-resource assignment unit 14 is configured to assign "Resource Element Groups", which constitute the CCE assigned to the PDCCH addressed to the mobile station UE, as a resource for the PDCCH addressed to the mobile station UE.

Thereafter, the radio base station eNB may perform an interleave process with respect to the resource for the PDCCH addressed to the mobile station UE in units of "Resource Element Groups" in order to randomize interference.

(Operation of the Mobile Communication System According to the First Embodiment of the Present Invention)

Figure 12:
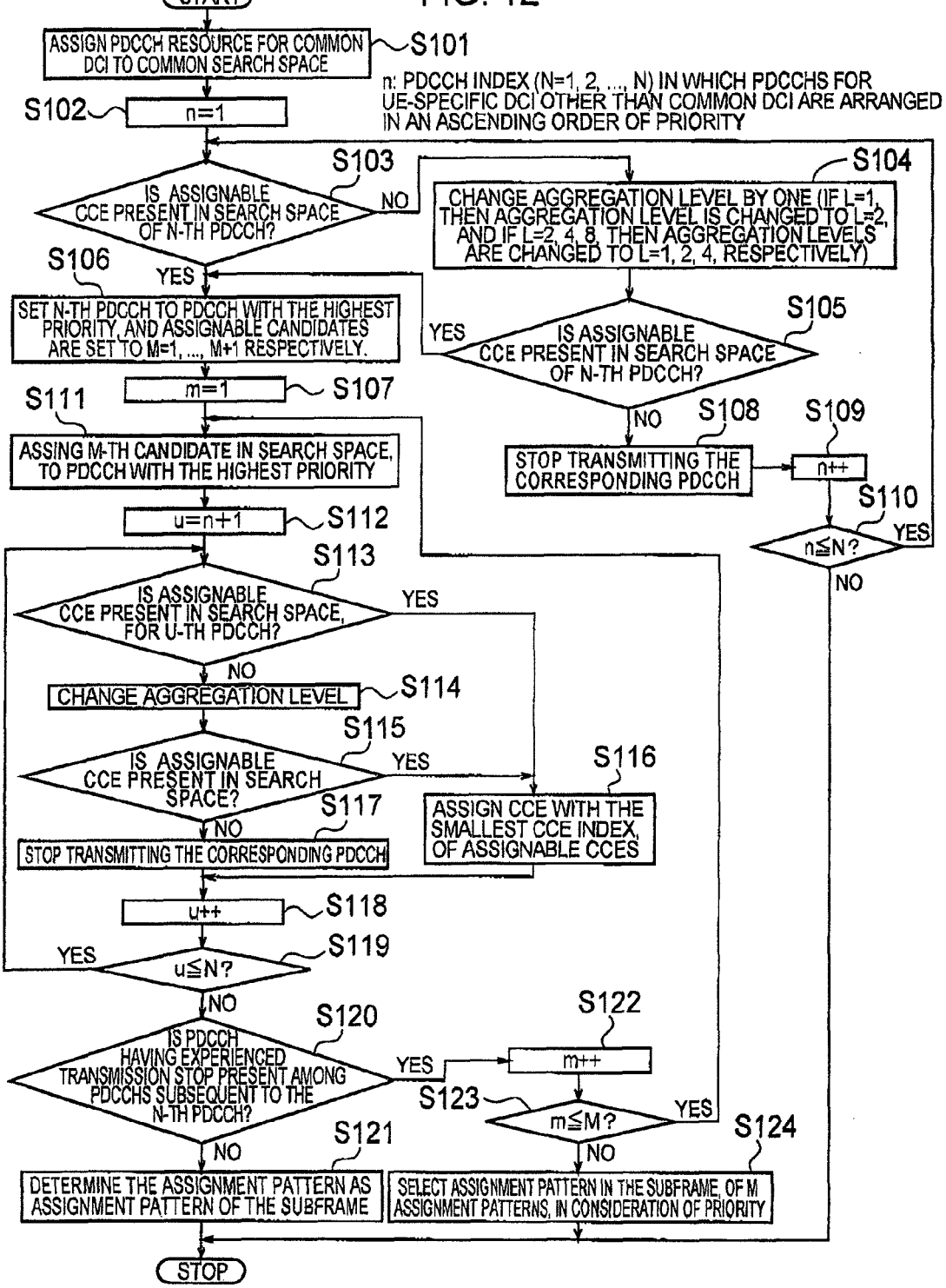
FIG. 12 is a flowchart illustrating the operation of the mobile communication system according to the first embodiment of the present invention.
Figure 13:
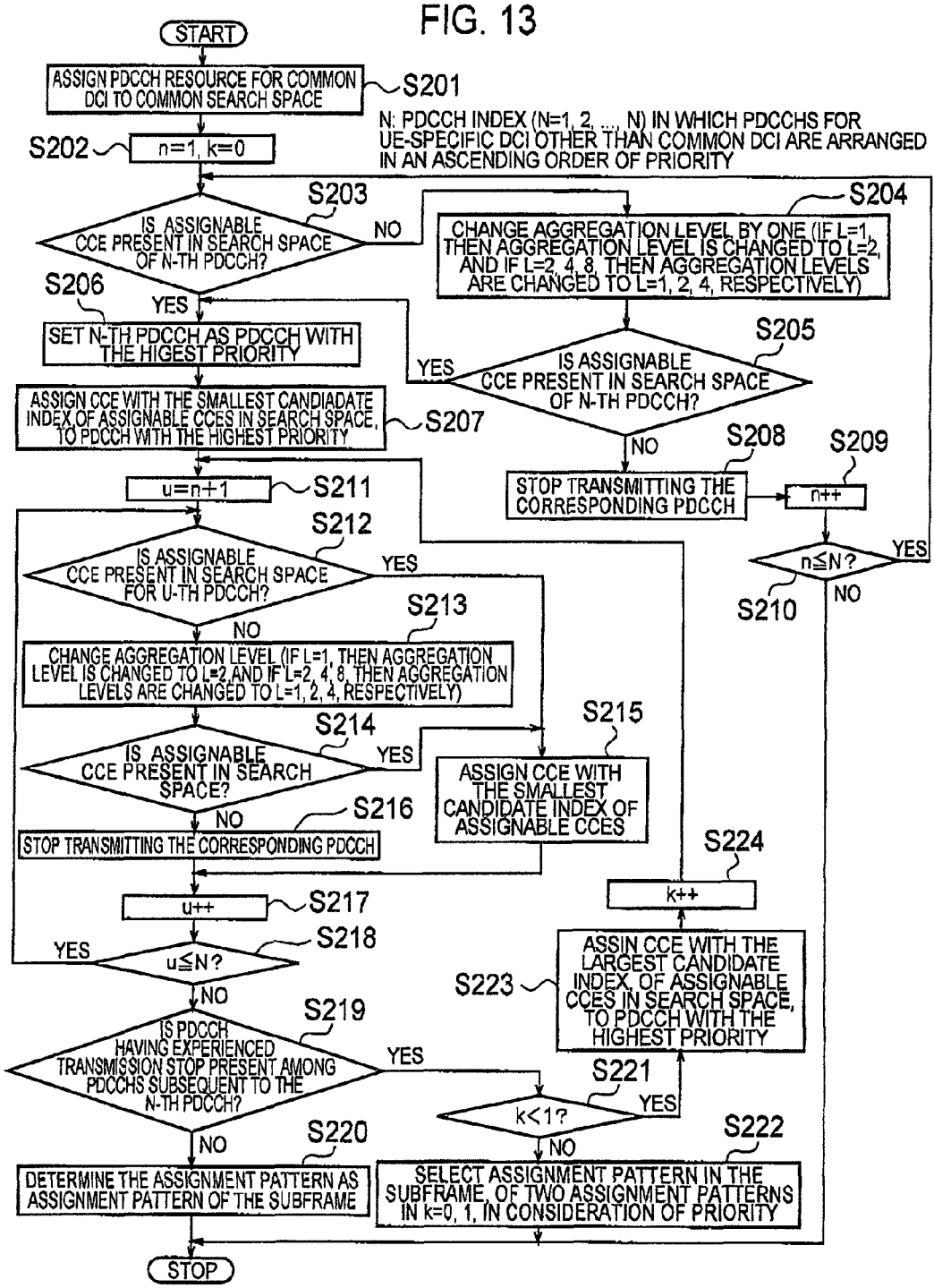
FIG. 13 is a flowchart illustrating the operation of the mobile communication system according to the first embodiment of the present invention.

With reference to FIG. 12 and FIG. 13, the operation of the mobile communication system according to the first embodiment of the present invention will be explained.

Firstly, with reference to FIG. 12, a first operation example of the mobile communication system according to the first embodiment of the present invention will be explained.

As illustrated in FIG. 12, in step S101, the radio base station eNB assigns CCEs in the common search space as a resource for the PDCCH (the common channel) for transmitting the common DCI.

Here, since the common search space includes CCE#0 to CCE#15, the CCEs in the common search space are sequentially assigned from a PDCCH (e.g., a PDCCH for a D-BCH) with a high priority among common channels, and from a PDCCH with a low CCE index.

In addition, an "Aggregation Level" for the common channel may be set as a fixed value in advance.

In step S102, the radio base station eNB sets "n=1(n=1 to N)". Here, "n" is an index when PDCCHs (UE-specific channels) for transmitting a UE-specific DCI other than the common DCI are arranged in an ascending order of priority.

In step S103, the radio base station eNB determines the "Aggregation Level" with respect to each UE-specific channel based on CQIs notified from each mobile station UE.

The radio base station eNB determines whether or not CCEs assignable to an n-th UE-specific channel exist in a search space for the n-th UE-specific channel determined based on the above-described "Aggregation Level".

When it is determined that the CCEs assignable to the n-th UE-specific channel do not exist due to a collision with CCEs assigned to the common channel, the radio base station eNB changes the above-described "Aggregation Level" by one level in step S104. In such a case, for example, the radio base station eNB changes the "Aggregation Level" from "1", "2", "4" and "8" to "2", "1", "2" and "4" respectively.

In step S105, the radio base station eNB determines whether or not the CCEs assignable to the n-th UE-specific channel exist in the search space for the n-th UE-specific channel determined based on the changed "Aggregation Level".

When it is determined that the CCEs assignable to the n-th UE-specific channel exist, the present operation proceeds to step S106. However, when it is determined that the CCEs assignable to the n-th UE-specific channel do not exist, the present operation proceeds to step S108.

In step S106, the radio base station eNB sets the n-th UE-specific channel as a UE-specific channel (highest PDCCH) with the highest priority. Here, in the search space for the n-th UE-specific channel, a CCE candidate assignable to the n-th UE-specific channel is set as CCE#m. Then, the radio base station eNB sets "m=1" in step S107.

Meanwhile, the radio base station eNB stops the transmission of the n-th UE-specific channel in step S108.

In step S109, the radio base station eNB increases "n" by "1". That is, the radio base station eNB sets a UE-specific channel with next high priority as the UE-specific channel (the n-th UE-specific channel) with the highest priority.

In step S110, the radio base station eNB determines whether or not "n≤N" is satisfied. When it is determined that "n≤N" is satisfied, the present operation returns to step S103. However, when it is determined that "n≤N" is not satisfied, the present operation terminates.

The radio base station eNB assigns CCE#m (an m-th candidate in the search space for the n-th UE-specific channel) to the n-th UE-specific channel in step S111, and sets "u=n+1" in step S112.

In step S113, the radio base station eNB determines whether or not CCEs assignable to a u-th UE-specific channel exist in a search space for the u-th UE-specific channel determined based on the above-described "Aggregation Level".

When it is determined that the CCEs assignable to the u-th UE-specific channel exist, the present operation proceeds to step S116. However, when it is determined that the CCEs assignable to the u-th UE-specific channel do not exist, the present operation proceeds to step S114.

In step S114, the radio base station eNB changes the above-described "Aggregation Level".

Here, the radio base station eNB may change the "Aggregation Level" to a value smaller by 1. When the "Aggregation Level" is "1", the radio base station eNB may change the "Aggregation Level" to "2".

Furthermore, the radio base station eNB may change the "Aggregation Level" to a value larger by 1. When the "Aggregation Level" is "8", the radio base station eNB may change the "Aggregation Level" to "4".

Furthermore, after changing the "Aggregation Level" to a value larger than an initial value of the "Aggregation Level" by 1, when it is determined that the CCEs assignable to the u-th UE-specific channel do not exist, the radio base station eNB may change the "Aggregation Level" to a value smaller than the initial value of the "Aggregation Level" by 1.

Furthermore, after changing the "Aggregation Level" to a value smaller than an initial value of the "Aggregation Level" by 1, when it is determined that the CCEs assignable to the u-th UE-specific channel do not exist, the radio base station eNB may change the "Aggregation Level" to a value larger than the initial value of the "Aggregation Level" by 1.

In step S115, the radio base station eNB determines whether or not the CCEs assignable to the u-th UE-specific channel exist in the search space for the u-th UE-specific channel determined based on the changed "Aggregation Level".

When it is determined that the CCEs assignable to the u-th UE-specific channel exist, the present operation proceeds to step S116. However, when it is determined that the CCEs assignable to the u-th UE-specific channel do not exist, the present operation proceeds to step S117. In addition, step S114 and step S115 may be omitted.

In step S116, the radio base station eNB assigns a CCE with the lowest CCE index, among the CCEs assignable to the u-th UE-specific channel in the search space for the u-th UE-specific channel, to the u-th UE-specific channel.

The radio base station eNB stops the transmission of the u-th UE-specific channel in step S117, increases "u" by "1" in step S118, and determines whether "u≤N" is satisfied in step S119.

When it is determined that "u≤N" is satisfied, the present operation returns to step S113. However, when it is determined that "u≤N" is not satisfied, the present operation proceeds to step S120.

In step S120, the radio base station eNB determines whether or not UE-specific channels having experienced transmission stop (PDCCHs to which CCEs are not assigned) exist among UE-specific channels subsequent to the n-th UE-specific channel (PDCCHs addressed to other mobile stations UE).

When it is determined that the UE-specific channels having experienced transmission stop do not exist, the present operation proceeds to step S121. However, when it is determined that the UE-specific channels having experienced transmission stop exist, the present operation proceeds to step S122.

In step S121, the radio base station eNB sets a CCE assignment pattern for a present UE-specific channel as a CCE assignment pattern for a UE-specific channel in a corresponding subframe.

The radio base station eNB increases "m" by "1" in step S122 and determines whether "m≤M" is satisfied in step S123.

When it is determined that "m≤M" is satisfied, the present operation returns to step S111. However, when it is determined that "m≤M" is not satisfied, the present operation proceeds to step S124.

In step S124, the radio base station eNB sets an assignment pattern with the smallest number of the UE-specific channels having experienced the transmission stop (the PDCCHs to which CCEs are not assigned) , among CCE assignment patterns for M UE-specific channels, as a CCE assignment pattern for the UE-specific channel in the corresponding subframe.

Here, the radio base station eNB may determine the CCE assignment pattern for the UE-specific channel in the corresponding subframe among the CCE assignment patterns for the M UE-specific channels by taking the priorities of each UE-specific channel into consideration.

For example, when there are a plurality of UE-specific channels having experienced transmission stop (PDCCHs to which CCEs are not assigned), the radio base station eNB may set an assignment pattern with the lowest priority of a UE-specific channel with the highest priority, among the UE-specific channels having experienced the transmission stop, as the CCE assignment pattern for the UE-specific channel in the corresponding subframe among a plurality of assignment patterns.

Next, a second operation example of the mobile communication system according to the first embodiment of the present invention will be described with reference to FIG. 13. Hereinafter, the second operation example of the mobile communication system according to the present embodiment will be described while focusing the difference relative to the first operation example of the mobile communication system according to the above-described embodiment.

As illustrated in FIG. 13, in step S201, the radio base station eNB assigns CCEs in the common search space as a resource for the common channel.

In step S202, the radio base station eNB sets "n=1 (n=1 to N", and "k=0". Here, "n" is an index when UE-specific channels are arranged in an ascending order of priority.

In step S203, the radio base station eNB determines the "Aggregation Level" with respect to each UE-specific channel based on CQIs notified from each mobile station UE.

The radio base station eNB determines whether or not CCEs assignable to an n-th UE-specific channel exist in a search space for the n-th UE-specific channel determined based on the above-described "Aggregation Level".

When it is determined that the CCEs assignable to the n-th UE-specific channel do not exist, the radio base station eNB changes the above-described "Aggregation Level" by one level in step S204. In such a case, for example, the radio base station eNB changes the "Aggregation Level" from "1", "2", "4" and "8" to "2", "1", "2" and "4" respectively.

In step S205, the radio base station eNB determines whether or not the CCEs assignable to the n-th UE-specific channel exist in the search space for the n-th UE-specific channel determined based on the changed "Aggregation Level".

When it is determined that the CCEs assignable to the n-th UE-specific channel exist, the present operation proceeds to step S206. However, when it is determined that the CCEs assignable to the n-th UE-specific channel do not exist, the present operation proceeds to step S208.

In step S206, the radio base station eNB sets the n-th UE-specific channel as a UE-specific channel (highest PDCCH) with the highest priority. In step S207, the radio base station eNB assigns a CCE with the lowest CCE index (a candidate index), among the CCEs assignable to the n-th UE-specific channel in the search space for the n-th UE-specific channel determined based on the above-described "Aggregation Level", to the n-th UE-specific channel.

Meanwhile, the radio base station eNB stops the transmission of the n-th UE-specific channel in step S208.

In step S209, the radio base station eNB increases "n" by "1". That is, the radio base station eNB sets a UE-specific channel with next high priority as the UE-specific channel (the n-th UE-specific channel) with the highest priority.

In step S210, the radio base station eNB determines whether or not "n≤N" is satisfied. When it is determined that "n≤N" is satisfied, the present operation returns to step S203. However, when it is determined that "n≤N" is not satisfied, the present operation terminates.

The radio base station eNB sets "u=n+1" in step S211, and determines whether or not CCEs assignable to a u-th UE-specific channel exist in the search space for the u-th UE-specific channel determined based on the above-described "Aggregation Level" in step S212.

When it is determined that the CCEs assignable to the u-th UE-specific channel exist, the present operation proceeds to step S215. However, when it is determined that the CCEs assignable to the u-th UE-specific channel do not exist, the present operation proceeds to step S213.

In step S213, the radio base station eNB changes the above-described "Aggregation Level".

Here, for example, the radio base station eNB may change the "Aggregation Level" to a value smaller by 1. When the "Aggregation Level" is "1", the radio base station eNB may change the "Aggregation Level" to "2".

In step S214, the radio base station eNB determines whether or not the CCEs assignable to the u-th UE-specific channel exist in the search space for the u-th UE-specific channel determined based on the changed "Aggregation Level".

When it is determined that the CCEs assignable to the u-th UE-specific channel exist, the present operation proceeds to step S215. However, when it is determined that the CCEs assignable to the u-th UE-specific channel do not exist, the present operation proceeds to step S216.

In step S215, the radio base station eNB assigns a CCE with the lowest CCE index, among the CCEs assignable to the u-th UE-specific channel in the search space for the u-th UE-specific channel, to the u-th UE-specific channel.

The radio base station eNB stops the transmission of the u-th UE-specific channel in step S216, increases "u" by "1" in step S217, and determines whether "u≤N" is satisfied in step S218.

When it is determined that "u≤N" is satisfied, the present operation returns to step S212. However, when it is determined that "u≤N" is not satisfied, the present operation proceeds to step S219.

In step S219, the radio base station eNB determines whether or not UE-specific channels having experienced transmission stop (PDCCHs to which CCEs are not assigned) exist among UE-specific channels subsequent to the n-th UE-specific channel (PDCCHs addressed to other mobile stations UE).

When it is determined that the UE-specific channels do not exist, the present operation proceeds to step S220. However, when it is determined that the UE-specific channels exist, the present operation proceeds to step S221.

In step S220, the radio base station eNB sets a CCE assignment pattern for a present UE-specific channel as a CCE assignment pattern for a UE-specific channel in a corresponding subframe.

In step S221, the radio base station eNB determines whether or not "k<1" is satisfied.

When it is determined that "k<1" is satisfied, the present operation returns to step S223. However, when it is determined that "k<1" is not satisfied, the present operation proceeds to step S222.

In step S222, the radio base station eNB sets an assignment pattern with the smallest number of the UE-specific channels having experienced the transmission stop (the PDCCHs to which CCEs are not assigned), among CCE assignment patterns for M UE-specific channels, as a CCE assignment pattern for the UE-specific channel in the corresponding subframe.

Here, the radio base station eNB may determine the CCE assignment pattern for the UE-specific channel in the corresponding subframe among the CCE assignment patterns for the M UE-specific channels by taking the priorities of each UE-specific channel into consideration.

In step S223, the radio base station eNB assigns a CCE with the highest CCE index (a candidate index), among the CCEs assignable to the n-th UE-specific channel in the search space for the n-th UE-specific channel determined based on the above-described "Aggregation Level", to the n-th UE-specific channel. In step S224, the radio base station eNB increases "k" by "1".

That is, as illustrated in the second operation example, the radio base station eNB may limit the candidates of the CCE assignment pattern for the UE-specific channel in the corresponding subframe.

Specifically, when deciding the CCE assignment pattern for the UE-specific channel in the corresponding subframe, the radio base station eNB may limit CCE candidates, which are assigned to the UE-specific channel (the n-th UE-specific channel) with the highest priority, to CCEs with the lowest numbered CCE index and the highest numbered CCE index.

For example, when the "Aggregation Level" of a UE-specific channel with the highest priority is "2" and a UE-specific search space for the UE-specific channel with the highest priority is "CCE#2 to CCE#11", as candidates of the CCE assignment pattern for the UE-specific channel in the corresponding subframe, six assignment patterns are assumed, which assign any one of CCE#2 and CCE#3, CCE#4 and CCE#5, CCE#6 and CCE#7, CCE#8 and CCE#9, and CCE#10 and CCE#11 to the UE-specific channel with the highest priority.

However, in order to reduce throughput, the candidates of the CCE assignment pattern for the UE-specific channel in the corresponding subframe may be limited to two assignment patterns which assign any one of CCE#2 and CCE#3, and CCE#10 and CCE#11 to the UE-specific channel with the highest priority.

(Operation and Effect of the Mobile Communication System According to the First Embodiment of the Present Invention)

According to the mobile communication system in accordance with the first embodiment of the present invention, when failing to assign the CCE to the PDCCH for transmitting a UE-specific DCI, the "Aggregation Level" is changed, so that it is possible to assign the CCE to the PDCCH for transmitting the UE-specific DCI again.

Furthermore, according to the mobile communication system in accordance with the first embodiment of the present invention, since it is not necessary to attempt to combine all "Aggregation Levels" and CCE assignments to all PDCCHs, it is possible to efficiently search for the CCE assignment pattern for the UE-specific channel in the corresponding subframe.

The above-mentioned aspects of the embodiments may be expressed as follows:

The first aspect of the present embodiment is summarized as a radio base station eNB, which is configured to assign a CCE including a plurality of continuous "Resource Element Groups" in an available radio resource to a PDCCH, includes the PDCCH-resource assignment unit 14 configured to determine an "Aggregation Level" indicating the number of continuous CCEs to be assigned to the PDCCH based on a CQI notified from the mobile station UE, to assign a plurality of continuous CCEs to the PDCCH addressed to the mobile station UE based on the determined "Aggregation Level", and to assign "Resource Element Groups" constituting the assigned CCEs as a resource for the PDCCH addressed to the mobile station UE, and when failing to assign the CCEs to the PDCCH addressed to the mobile station LIE, the PDCCH-resource assignment unit 14 assigns a plurality of continuous CCEs to the PDCCH addressed to the mobile station UE based on a changed "Aggregation Level".

In the first aspect of the present embodiment, the mobile station UE-dedicated search space indicates the range of CCEs in which each mobile station UE searches for PDCCHs addressed to each mobile station UE in an available radio resource, and the PDCCH-resource assignment unit 14 may be configured to determine the mobile station UE-dedicated search space, and to assign the CCEs to the PDCCH addressed to the mobile station UE in the mobile station UE-dedicated search space.

In the first aspect of the present embodiment, the PDCCH-resource assignment unit 14 may be configured to determine the mobile station UE-dedicated search space, based on the identification information of the mobile station UE, the "Aggregation Level" determined for the mobile station UE and the subframe number in the available radio resource.

In the first aspect of the present embodiment, the PDCCH-resource assignment unit 14 may be configured to sequentially assign CCEs to a PDCCH addressed to another mobile station UE after assigning CCEs to a PDCCH addressed to a mobile station UE with the highest priority, to employ patterns with the smallest number, by which the assignment of CCEs to the PDCCH addressed to another mobile station UE is failed, from among a plurality of assignment patterns with respect to the CCEs for the PDCCH addressed to the mobile station UE with the highest priority, and to assign CCEs to PDCCHs addressed to all mobile stations UE based on the employed patterns.

The operation of the above-described mobile station UE or radio base station eNB may be implemented by a hardware, may also be implemented by a software module executed by a processor, and may further be implemented by the combination of the both.

The software module may be arranged in a storing medium of an arbitrary format such as RAM (Random Access Memory), a flash memory, ROM (Read Only Memory), EPROM (Erasable Programmable ROM), EEPROM (Electronically Erasable and Programmable ROM), a register, a hard disk, a removable disk, and CD-ROM.

Such a storing medium is connected to the processor so that the processor can write and read information into and from the storing medium. Such a storing medium may also be accumulated in the processor. Such a storing medium and processor may be arranged in ASIC. Such ASIC may be arranged in the mobile station UE and the radio base station eNB. As a discrete component, such a storing medium and processor may be arranged in the mobile station UE and the radio base station eNB.

Thus, the present invention has been explained in detail by using the above-described embodiments; however, it is obvious that for persons skilled in the art, the present invention is not limited to the embodiments explained herein. The present invention can be implemented as a corrected, modified mode without departing from the gist and the scope of the present invention defined by the claims. Therefore, the description of the specification is intended for explaining the example only and does not impose any limited meaning to the present invention.

The invention claimed is:

1. A radio base station for assigning control channel elements to a physical downlink control channel addressed to a mobile station, the radio base station comprising:
   a memory;
   a processor communicating with the memory;
   the processor configured to:
   determine an aggregation level indicating a number of continuous control channel elements to be assigned to the physical downlink control channel based on a reception quality notified from the mobile station;

assign a first plurality of continuous control channel elements to the physical downlink control channel addressed to the mobile station, based on the determined aggregation level;

assign resource element groups, comprising one or more radio resources and constituting the assigned control channel elements, as a resource for the physical downlink control channel addressed to the mobile station; and vary the size of a search space for each aggregation level, wherein a search space indicates a range of control channel elements in which the mobile station searches for the physical downlink control channel addressed to the mobile station;

wherein, when the processor fails to assign the control channel elements corresponding to the aggregation level determined based on the notified reception quality, the processor is further configured to:

change the aggregation level determined based on the notified reception quality, assign a second plurality of continuous control channel elements to the physical downlink control channel addressed to the mobile station based on the changed aggregation level.

2. The radio base station according to claim 1,
wherein the processor determines the search space and assigns the control channel elements to the physical downlink control channel addressed to the mobile station in the search space.

3. The radio base station according to claim 2, wherein the processor determines the search space, based on identification information of the mobile station, the aggregation level determined for the mobile station, and a subframe number in the available radio resource.

4. The radio base station according to claim 1, wherein the processor sequentially assigns control channel elements to a physical downlink control channel addressed to a second mobile station, after assigning control channel elements to the physical downlink control channel addressed to the mobile station, wherein the mobile station has the highest priority; and wherein the processor employs assigning patterns of control channels with a smallest number of times the assignment of the control channel elements to the physical downlink control channel addressed to the second mobile station is failed, from among a plurality of assignment patterns with respect to the control channel elements for the physical downlink control channel addressed to the mobile station, and to assign control channel elements to physical downlink control channels addressed to all mobile stations based on the employed assignment patterns.

* * * * *